3,022,311
YOHIMBINE AND α-YOHIMBINE DERIVATIVES
Frank L. Weisenborn, Middlebush, and Samuel C. Pan, Metuchen, N.J., assignors to Olin Mathieson Chemical Corporation, New York, N.Y., a corporation of Virginia
No Drawing. Filed Apr. 25, 1958, Ser. No. 730,796
7 Claims. (Cl. 260—287)

This invention relates to the synthesis of new alkaloids and, more particularly, to the preparation of 18-hydroxyyohimbines and ester, acetal and ketal derivatives thereof.

The new yohimbine derivatives of this invention may be represented by the general formula

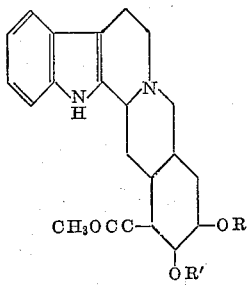

wherein R and R' are hydrogen or acyl and, in those instances where the oxy radicals in the 17- and 18-positions are cis, together R and R' is an alkylidene radical. Particularly preferred are those compounds wherein R and R' are hydrogen or a lower alkanoyl radical and together R and R' is a lower alkylidene radical. Among the compounds of this invention may be mentioned 18-hydroxyyohimbine, 18-hydroxypseudoyohimbine, 18-hydroxy-3-epi-α-yohimbine, 18-hydroxyalloyohimbine, 18-hydroxy-α-yohimbine, 18-hydroxy-β-yohimbine, 17,18-diesters thereof, such as the di(lower alkanoic acid) esters (e.g., 18α-hydroxyyohimbine 17α, 18α-diacetate), and 17,18-acetals or ketals of those 18-hydroxyyohimbines wherein the 17- and 18-hydroxy groups are cis with lower alkanals or lower alkanones (e.g., 18α-hydroxyyohimbine acetonide and 17α,18α-ethylidene 18α-hydroxyyohimbine).

The new yohimbine derivatives of this invention are pharmacologically active alkaloids which possess adrenolytic activity. Thus, the compounds of this invention can be used in lieu of known adrenolytic compounds such as phentolamine in the treatment of peripheral vascular diseases, or the diagnosis of pheochromocytoma, for which purpose they are administered orally or parenterally in the same manner as phentolamine.

The 18-hydroxyyohimbines are prepared by causing the enzymes of *Streptomyces aureofaciens, Streptomyces rimosus, Streptomyces antibioticus, Streptomyces fradiae, Streptomyces olivaceus* or *Streptomyces roseochromogenus* to act on a yohimbine (e.g., yohimbine, pseudoyohimbine, 3-epi-α-yohimbine, alloyohimbine, α-yohimbine and β-yohimbine). The reaction may be accomplished by including the yohimbine in an aerobic culture of the microorganism or by bringing together, in an aqueous medium, the yohimbine, air and enzymes of non-proliferating cells of the microorganism. In general, the conditions of culturing the Streptomyces for the purposes of this invention are (except for the inclusion of the yohimbine to be converted) the same as those of culturing *Streptomyces aureofaciens* for the production of chlortetracycline or tetracycline, i.e., the microorganism is aerobically grown in contact with (in or on) a suitable fermentation medium. A suitable medium essentially comprises a source of nitrogenous and growth-promoting factors, and an assimilable source of carbon and energy. The latter may be a carbohydrate and/or the yohimbine itself. Preferably, however, the medium includes an assimilable source of carbon and energy in addition to the yohimbine.

The nitrogen source materials may be organic (e.g., soybean meal, cornsteep liquor, meat extract and/or distillers solubles) or synthetic (i.e., composed of simple, synthesizable organic or inorganic compounds such as ammonium salts, alkali nitrates, amino acids, urea or thiourea).

As to the energy source materials, lipids such as fats or fatty acids (e.g., lard oil, soybean oil, linseed oil, cottonseed oil, peanut oil, fancy mutton tallow, sperm oil, olive oil, tristearin, triolein, and stearic, palmitic, oleic, linoleic and myristic acid); carbohydrates (e.g., glucose, fructose, sucrose, lactose, maltose, dextrins and starches); or glycerol may be used. These materials may be employed either in purified state or as concentrates, such as whey concentrate, corn, wheat or barley mash, or mixtures thereof. It is to be noted, however, that yohimbine is added to the fermentation medium essentially as a precursor and not as an energy source.

To prepare the esters of this invention the 18-hydroxyyohimbines are interacted with an acylating agent such as an acyl halide or acid anhydride (e.g., a lower alkanoic acid anhydride such as acetic anhydride). To form the diester, at least two equivalents of acylating agent per mole of 18-hydroxyyohimbine is employed. The reaction is preferably conducted in the presence of an organic base (e.g., pyridine).

To prepare the acetal and ketals of this invention, the 18-hydroxyyohimbines (having the hydroxy groups at 17 and 18 cis) are interacted with an aldehyde or ketone (e.g., a lower alkanal such as acetaldehyde and a lower alkanone such as acetone). The reaction is preferably conducted in the presence of a strong acid such as perchloric acid.

The following examples are illustrative of the invention:

EXAMPLE 1

*18α-hydroxyyohimbine*

(a) *Fermentation*—A one-week old agar slant (prepared by growing the culture on a medium composed of 1.0 g. of glucose, 0.25 g. of yeast extract, 0.1 g. of dipotassium hydrogen phosphate and 2 g. of agar in 100 ml. of water) of *Streptomyces aureofaciens* A.T.C.C. 13132 is used to inoculate two flasks, each containing 100 ml. of an aqueous sterlized medium containing 1.5% soybean meal, 2.5% glucose and 0.25% calcium carbonate. The flasks are incubated at 25° C. on a rotary shaker set at 280 r.p.m. with a 2-inch displacement. After four days, these growing cultures are used to inoculate 45 flasks containing 100 ml. each of the same medium. To each flask is added 5 ml. of a solution formed by dissolving 2.25 g. of yohimbine hydrochloride in 225 ml. of water and sterilizing by filtration through sintered glass. The flasks are then incubated on the same shaker and harvested after two weeks.

(b) *Isolation*.—The harvested broth (4.5 liters) are combined, adjusted to pH 9–10 and extracted four times with 800-ml. portions of methyl isobutyl ketone. The unreacted starting material and the 18α-hydroxyyohimbine now present in the methyl isobutyl ketone are extracted back into an aqueous acid solution by shaking with 0.024 N sulfuric acid (700 ml.). This aqueous solution is adjusted to pH 6.0 with sodium hydroxide, buffered at that pH with McIlvaines buffer and extracted twice with benzene (350 ml. each time) to remove most of the yohimbine. The aqueous phase is then adjusted to pH 9–10 and extracted four times with chloroform (250 ml. each time). The chloroform extract is dried over anhydrous sodium sulfate and evaporated down to dryness under vacuum.

The solids obtained are dissolved in 6 ml. of methanol and chromatographed on 12 sheets of Whatman No. 1 filter paper, 10.5" wide. The solvent system used is i-amyl alcohol-carbon tetrachloride-propionic acid (100:10:2) against water vapor equilibrated paper. The chromatogram is allowed to develop for 40 hours. The product appears as a band 3–4 inches wide with the front located approximately 7" from the origin. This band can be detected by fluorescence under ultraviolet light, absorption of ultraviolet light and reduction of ferric ferricyanide reagent used as a spray. The band is cut off, shredded and eluted 4–5 times with methanol. The methanol eluate is taken to dryness in vacuo and the residue taken up in chloroform. The chloroform solution is washed with 5% sodium bicarbonate solution, dried over sodium sulfate and concentrated to dryness. The 18α-hydroxyyohimbine obtained crystallizes in colorless cubes from ethyl acetate-acetone, M.P. about 252–252.5° C. $[\alpha]_D + 37°$ (in ethanol).

EXAMPLE 2

Following the procedure of Example 1, but substituting *Streptomyces rimosus* N.R.R.L. 2234 for the *Streptomyces aureofaciens* A.T.C.C. 13132, there is obtained 18α-hydroxyyohimbine.

Similarly, *Streptomyces antibioticus* A.T.C.C. 8663, *Streptomyces fradiae* (Waksman No. 3556A, Institute of Microbiology, Rutgers University, New Brunswick, New Jersey), *Streptomyces olivaceus* N.R.R.L. B1125, and *Streptomyces roseochromogenus* (Waksman No. 3689) also form 18α-hydroxyyohimbine.

EXAMPLE 3

*18-hydroxy-α-yohimbine*

Following the procedure of Example 1, but substituting α-yohimbine for yohimbine in the process of the example, there is obtained 18-hydroxy-α-yohimbine, isolated as the hydrochloride, M.P. 288–290°, on crystallizing from methanolic-hydrogen chloride solution.

Similarly, by substituting pseudoyohimbine, 3-epi-α-yohimbine, allo-yohimbine, or β-yohimbine for yohimbine in Example 1 or α-yohimbine in Example 3, the respective 18-hydroxy derivatives are obtained.

EXAMPLE 4

*18α-hydroxyyohimbine 17,18-diacetate*

18α-hydroxyyohimbine (104 mg.) is dissolved in 8.0 ml. of dry pyridine and 4 ml. of acetic anhydride and the solution allowed to stand at room temperature for two days. The solvents are removed under vacuum and the residue distributed between chloroform and 5% sodium bicarbonate. The chloroform extracts are dried over sodium sulfate and concentrated to dryness. The residue crystallizes from methylene chloride-methanol to give about 115 mg. of 18α-hydroxyyohimbine diacetate, M.P. about 307–307.5 C., $[\alpha]_D - 39°$ (in methanol).

Similarly, but substituting other esterifying agents, such as propionic anhydride, for the acetic anhydride in Example 4, the corresponding diester derivatives are formed. Furthermore, by substituting the 18-hydroxyyohimbines, such as 18-hydroxy-α-yohimbine, 18-hydroxy-β-yohimbine and 18-hydroxypseudoyohimbine, for the 18α-hydroxyyohimbine in Example 4, the corresponding 17,18-diacetates are formed.

EXAMPLE 5

*Acetonide of 18α-hydroxyyohimbine*

18α-hydroxyyohimbine (23 mg.) is dissolved in 30 ml. of acetone containing 0.1 ml. of 70% perchloric acid. After standing three days at room temperature the solution is neutralized with ammonium hydroxide and concentrated to dryness. The residue is distributed between chloroform and 5% sodium bicarbonate. The chloroform extracts are dried over sodium sulfate and taken to dryness. The residue is then taken up in methylene chloride-ether from which a small amount of unreacted 18α-hydroxyyohimbine crystallizes on concentrating the solution. The solution is then diluted with hexane and the product, the acetonide of 18α-hydroxyyohimbine crystallizes in colorless needles (about 15 mg.), M.P. about 258–259° C.

Similarly by substituting other aldehydes and ketones, such as paraldehyde, methyl ethyl ketone, methyl isobutyl ketone and diethyl ketone for the acetone in the procedure of Example 5, the corresponding acetal and ketal derivatives are formed. Furthermore, all other 18-hydroxyyohimbines wherein 17- and 18-hydroxy groups are cis correspondingly yield acetonide derivatives.

The invention may be variously otherwise embodied within the scope of the appended claims.

What is claimed is:

1. A compound selected from the group consisting of 18α-hydroxyyohimbine, 18α-hydroxyyohimbine 17α,18α-di(lower alkanoate), 18-hydroxy-α-yohimbine, and 18-hydroxy-α-yohimbine 17α,18-di(lower alkanoate).
2. 18α-hydroxyyohimbine.
3. 18-hydroxy-α-yohimbine.
4. 18α-hydroxyyohimbine 17α,18α-di(lower alkanoate).
5. 18α-hydroxyyohimbine 17α,18α-diacetate.
6. 17α,18α-(lower alkylidene) 18α-hydroxyyohimbine.
7. 17α,18α-isopropylidene 18α-hydroxyyohimbine.

References Cited in the file of this patent

UNITED STATES PATENTS 2,770,627     Belding _____ Nov. 13, 1956

FOREIGN PATENTS

Karrer: Organic Chemistry, 2nd ed. (1946), pages 92–102.

Slater et al.: Proceedings of the Soc. of Exp. Biol., vol. 88, #2, pages 293–95 (1955).

Fieser et al.: Organic Chemistry, 3rd ed., Reinhold, New York (1956), page 215.

Klohs et al.: JACS, vol. 19, 1957, pages 3763–3766.

Van Tamelen et al.: JACS, vol. 79, 1957, pages 5256–5262.